(12) United States Patent
Landers

(10) Patent No.: US 6,217,688 B1
(45) Date of Patent: Apr. 17, 2001

(54) METHOD OF REPAIRING A FLANGED PIPE JOINT

(76) Inventor: Phillip G. Landers, 494 Sabal Trail Cir., Longwood, FL (US) 32779

( * ) Notice: Subject to any disclaimer, the term of this patent is extended or adjusted under 35 U.S.C. 154(b) by 0 days.

(21) Appl. No.: 09/236,449

(22) Filed: Jan. 25, 1999

(51) Int. Cl.[7] ............................ B29C 63/22; F16L 55/16
(52) U.S. Cl. ........................ 156/94; 138/99; 264/36.16; 264/36.22; 285/15
(58) Field of Search ............................ 156/94; 427/140, 427/142; 264/36.15, 36.16, 36.22; 29/402.18; 138/97, 98, 99; 285/15

(56) References Cited

U.S. PATENT DOCUMENTS

| | | | |
|---|---|---|---|
| 3,563,276 | * | 2/1971 | Hight ........................ 156/94 |
| 4,108,194 | * | 8/1978 | Harrison et al. ............... 138/94 |
| 4,133,351 | * | 1/1979 | Harrison et al. ............... 285/15 |
| 4,202,377 | * | 5/1980 | Harrison ..................... 138/94 |
| 4,209,029 | * | 6/1980 | Pennington ................... 138/99 |
| 4,268,070 | * | 5/1981 | Adams ........................ 285/15 |
| 4,552,183 | * | 11/1985 | Chick ........................ 285/15 |
| 4,568,091 | * | 2/1986 | Harrison ..................... 285/15 |
| 4,576,401 | * | 3/1986 | Harrison ..................... 285/15 |
| 4,607,469 | * | 8/1986 | Harrison ..................... 52/220 |
| 4,756,338 | * | 7/1988 | Guxatt et al. ................. 138/99 |
| 5,814,387 | * | 9/1998 | Orihara et al. ................ 285/15 |

FOREIGN PATENT DOCUMENTS

| | | | |
|---|---|---|---|
| 2670557 | * | 6/1992 | (FR) ......................... 285/15 |
| 1166335 | * | 10/1969 | (GB) ......................... 285/15 |
| 2080916 | * | 2/1982 | (GB) ......................... 138/97 |

\* cited by examiner

Primary Examiner—Steven D. Maki
(74) Attorney, Agent, or Firm—William M. Hobby, III

(57) ABSTRACT

A method of repairing a flanged pipe joint includes selecting a flexible sheet of material and mounting a tube through the selected material to form a passageway therethrough. One end of the mounted tube is positioned against a flanged pipe joint and the flexible sheet of material is wrapped around the pipe flange joint and attached thereto. A coating, such as an epoxy polymer, is coated over the wrapped flexible material extending over the flanged pipe joint and adjacent pipe, which coating is cured while any liquid leaking from the flanged pipe joint escapes through the tube. Once the coating is cured, the tube can be plugged by either removing the capped tube or injecting a material to seal the tube. The tube also has an end member shaped to fit over a flanged joint for positioning the pipe for drainage of material leaking from the flanged joint.

12 Claims, 2 Drawing Sheets

METHOD OF REPAIRING A FLANGED PIPE JOINT

BACKGROUND OF THE INVENTION

The present invention relates to a method for repairing pipe line leaks and more particularly to a method of repairing and sealing leaking flange pipe couplings and the like.

Flange pipe couplings are widely used for connecting various sections of pipe which operate in moderate to high pressures. Various configurations of seals are utilized between the flanges. One of the most common configurations is a raised face on the inner portion of each of the flanges with an annular gasket being placed between the raised faces. When the flanges are bolted together, the raised flanges compress the gasket material to form a seal. Leaks often begin in such flange pipe couplings because of deterioration of the gasket material or by shifting of the pipe.

Similarly, a leak may occur in the outer wall of a pipe section due to a defect in the manufacture of the pipe because of damage done to the pipe during or after installation. Such leaks must be repaired and, often in the past, the pipeline had to be shut down and drained of its contents before the repair could be affected.

As a result of the problem of repairing these pipe flanges, a number of techniques for sealing a leak between pipe flanges have been known in the prior art. Flange gasket leaks have been repaired by flange enclosures which completely enclose the flange which enclosure is filled with a hardening plastic or material to completely seal the flange joint when the plastic hardens. A wire wrap repair uses wires clamped over the edges of the flanges or use flat face band for flange repairs. Other flange repairs have been accomplished with a crunch-groove clamp or tongue clamp repair or with a tongue and packing clamp repair. It has also been suggested to use a packing clamp tubing repair, a full packing clamp repair and a flange-to-line clamp.

One prior U.S. patent which relates to a method and apparatus for sealing a leak in a pipeline can be seen in U.S. Pat. No. 4,209,029 for a method and apparatus for sealing a leak in a pipeline in which a leak repair clamp is provided for originally sealing the leak. The clamp includes a body forming a cavity between the pipeline and body for receiving a sealant in the passageway through the body for injecting the sealant in the cavity. A plug is provided for stopping the sealant passageway after the sealant has been injected. U.S. Pat. No. 4,607,469 provides a seal for waterproofing a utility line, conduit and a method of forming the seal. U.S. Pat. No. 4,576,401 is a leak repair clamp for pipe and pipe flanges which includes a frame having a plurality of one piece frame segments positionable in end-to-end relationship around the pipe. Access is provided to each frame segment to permit the passing of liquid sealant into the recess defined by the segment. U.S. Pat. No. 4,568,091 is for a leak repair clamp with a flexible lip seal that allows a sleeve to be fitted around the outside of a cylindrical surface and an elastomeric fluid pressure seal segment mounted within each groove in the sleeve to provide a fluid-type seal within the space confined between the grooves. In U.S. Pat. No. 4,202,377, a pipe cleaning and plugging apparatus allows plugging a pipeline through a side opening while U.S. Pat. No. 4,133,351 is a method and apparatus for sealing a pipeline leak which occurs at the flanged connection of pipelines using a wire wrapped around the upper surface of the flange connecting bolts for filling the gap between the flanges and above the bolts. An injection valve means is installed for relieving pressure from inside the gas while the wire is being wrapped and for injecting a sealant to the interior of the gap between the wire wrap. A sealant is used to fill the gap between the wire wrap for stopping the leak. In U.S. Pat. No. 4,268,070, an orifice flange clamp has a pair of semi-circular bands adapted to be clamped together around the periphery of the inner face of orifice flanges. U.S. Pat. No. 4,108,194 is a method and apparatus for a tapered pipeline seal and includes means for enabling a line to be sealed with a rotatable tapered sealing plug.

One of the problems with prior art methods for sealing flange gasket leaks is that the pipes are leaking after the flange joints have been enclosed and while the sealant is being injected into the casing and before the sealant hardens. This allows puddling or weakened areas in the sealant while the sealant is curing which thereby reduces the strength of the flange joint seals. The present invention is directed towards an improved method of repairing flange pipe joints which allows a leaking seal on a flange joint to continue leaking and to be drained away until the repair has been completely affected after the seal encasing material, such as an epoxy sealant, has completely encapsulated the flange joint except for a drainage opening. The drainage opening can then be sealed to complete the repair. This makes for a fast repair in which a sealing bladder of flexible material, such as a flexible plastic sheet, has a tube attached therethrough with an end shaped to fit against the flange joint of a leaking pipe. The bladder sheet can then enclose the flange joint and be strapped to the leaking flange joint. A coating, such as an epoxy, can then be coated over the entire bladder on the outside to seal the entire bladder and adjacent pipe within an encapsulating material which is allowed to cure in the open air without any contact from liquid leaking from a flange seal. Once the repair has been completed, the drainage tube is plugged or sealed off.

It is accordingly an aim of the present invention to provide an improved method of sealing a pipe flanged joint to seal flange gasket leaks which obviates the problem of the sealing material becoming weakened or contaminated by a leaking fluid.

SUMMARY OF THE INVENTION

A method of repairing a flanged pipe joint includes selecting a flexible sheet of material and mounting a tube through the selected material to form a passageway therethrough. One end of the mounted tube is positioned against a flanged pipe joint and the flexible sheet of material is wrapped around the pipe flange joint and attached thereto. A coating, such as an epoxy polymer, is coated over the wrapped flexible material extending over the flanged pipe joint and adjacent pipe, which coating is cured while any liquid leaking from the flanged pipe joint escapes through the tube. Once the coating is cured, the tube can be plugged by either removing the capped tube or injecting a material to seal the tube. The tube also has an end member shaped to fit over a flanged joint for positioning the pipe for drainage of material leaking from the flanged joint.

BRIEF DESCRIPTION OF THE DRAWINGS

Other objects, features, and advantages of the present invention will be apparent from the written description and the drawings in which.

DESCRIPTION THE PREFERRED EMBODIMENT

Figure 1:
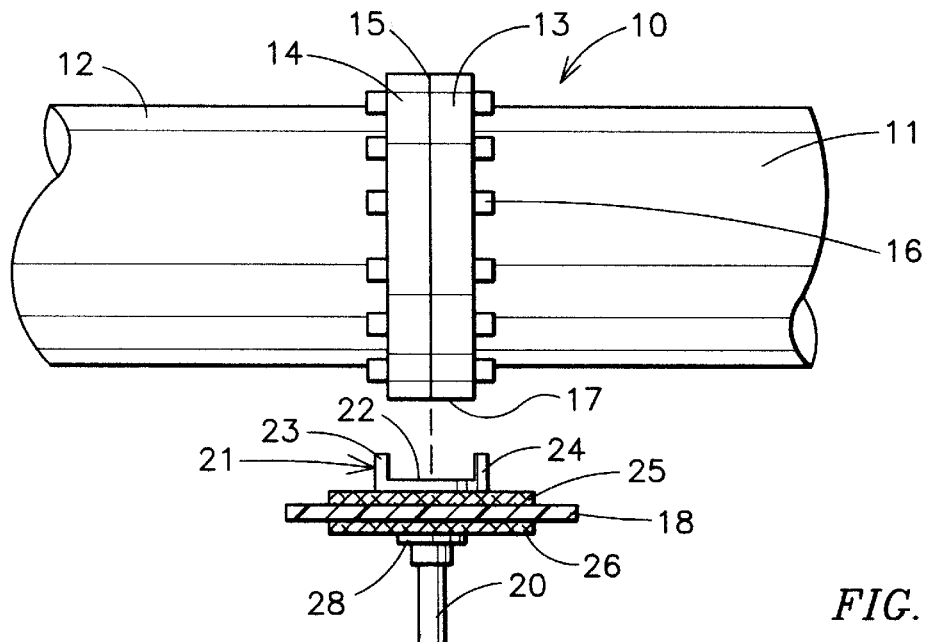
FIG. 1 is an exploded sectional view of a flange-type joint and repair cover in accordance with the present invention.

Referring to the drawings, the steps and a process for repairing a flange gasket leak are illustrated in which a flanged pipe joint 10 is formed from a connection of pipes 11 and 12. Pipe 11 has a flange 13 while pipe 12 has a flanged end 14. Flanges 13 and 14 are pulled together over a gasket 15 and the flanges are bolted together with bolts 16. If any part of a gasket 15 has a leak from the pipes 11 and 12, the leaking fluid tends to follow the gasket line around the connected flanges and drains from the bottom 17 of the pipe flange joint 10. The present method involves selecting a bladder material or a polymer sheet of material 18 for wrapping around the pipe joint 10 and selecting a tube 20 to which an end member 21 has been attached. The end member 21 is shaped in a generally U-shaped channel having a bottom 22 and a pair of sides 23 sized for fitting over the bottom portion 17 of the pipe joint 10 so that leaking liquid from the flange joint 10 can run into the end member 21 between the sides 23 and 24 and through the drain tube 20. A selected bladder material 18 has a hole cut therein and the tube 20 inserted therebetween over a flexible gasket material 25. A second piece of flexible gasket material 26 is placed over the tube 20 and the tube is anchored with a locking member 27 which can be a threaded locking member or can be attached with an adhesive or can be soldered to seal the flexible gasket members 25 and 26 and the sheet of bladder material 18 between end member 21 and the locking member 27. Locking member 27 includes a washer portion 28 for clamping down on the flexible materials 18, 25 and 26.

Figure 2:
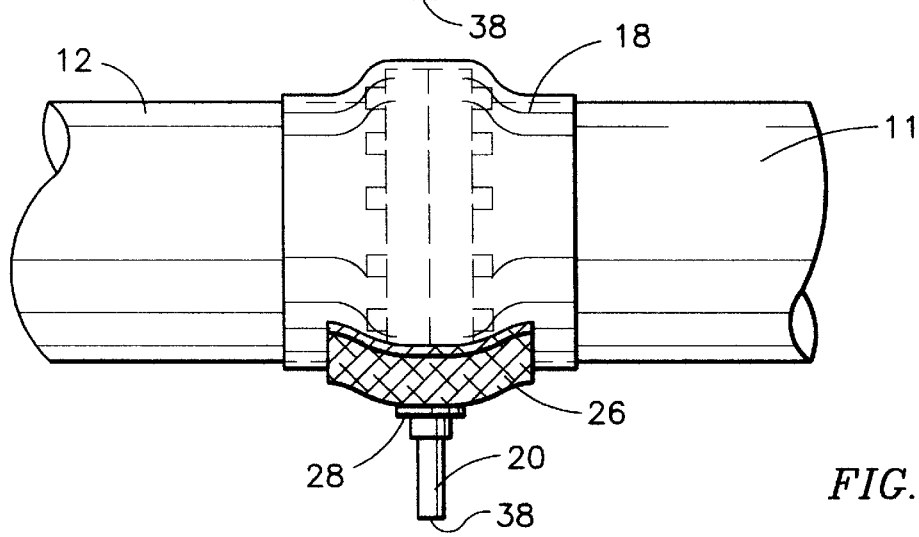
FIG. 2 is a side elevation of the flange pipe joint having a covering bladder.
Figure 3:
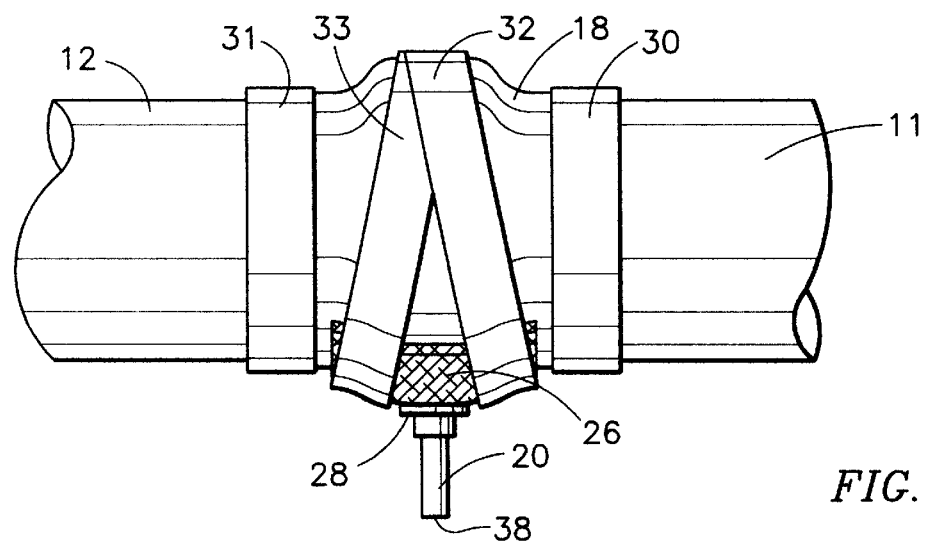
FIG. 3 is a side elevation of the covered flange pipe joint of FIG. 2 strapped into place.
Figure 4:
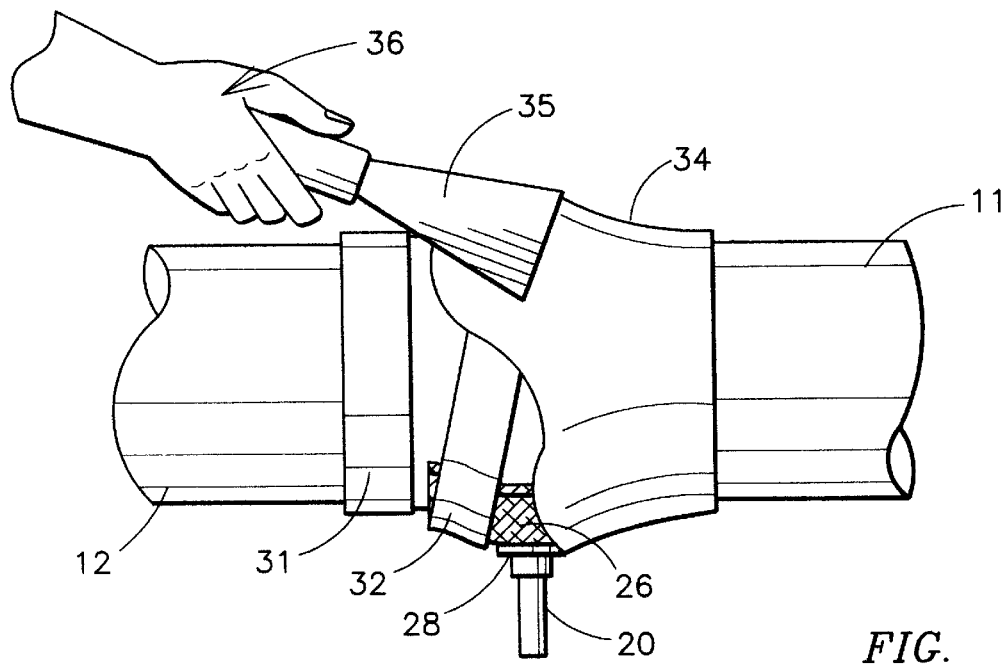
FIG. 4 is a side elevation of the strapped covered flange pipe joint being covered with a hardening encapsulating coating.
Figure 5:
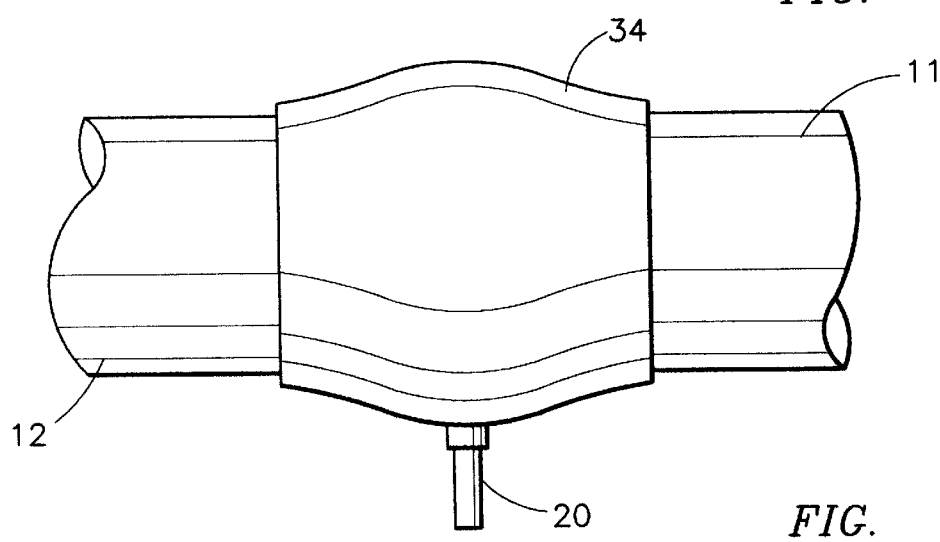
FIG. 5 is a side elevation of the repaired flange pipe joint having an open drain.
Figure 6:
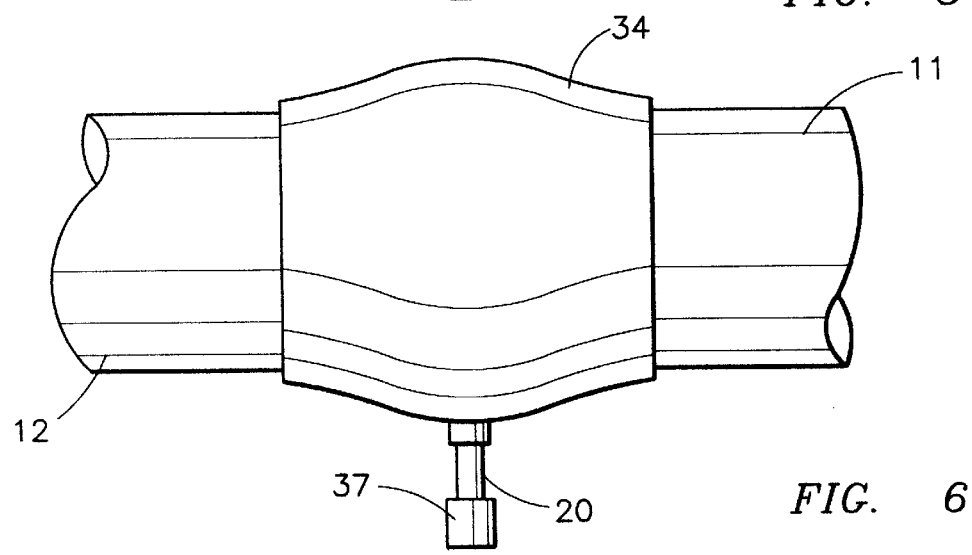
FIG. 6 is the repaired flange pipe joint of FIG. 5 having the open drain capped.

FIG. 1 shows the flanged pipe joint prior to attaching the bladder material 18 thereover. In FIG. 2, the sheet of bladder material 18 is wrapped around the joint 10 and portions of the pipes 11 and 12 after the end member 21 has been placed onto the bottom 17 of the flange joint 10. The wrapped bladder 18 is then strapped in FIG. 3 with straps 30 and 31 to the pipes 11 and 12 to form a seal with the bands 30 and 31. Additional straps or bands 32 and 33 are strapped over the flange joint 10 around the bladder material 18 and over the edges of the reinforcing gaskets 26 adjacent the outlet of the pipe 20 to thereby hold the pipe 20 and end member 21 in positioned on the bottom 17 of the pipe joint 10. A coating and sealing material 34 is next selected, which may be an epoxy polymer material in which the two-part epoxy, including the resin and the hardener, are kneaded together within a plastic container. The coating material 34 is dispensed over the flanged pipe joint 10 in FIG. 4 over the flexible sheet covering 18 and over the pipe 11 and 12 end portions to provide a seal covering the entire pipe joint 10 over the flexible bladder 18 and onto pipes 11 and 12. The tube 20 is left open for escaping liquid from the pipe joint 10 gasket 15. The epoxy coating 34 may be applied with a spatula or trowel 35 by an individual's hand 36, as shown in FIG. 4, and is allowed to cure, as shown in FIG. 5, to form a complete encapsulated pipe joint 10. As seen in FIG. 6, the tube 20, which has been allowed to drain liquids leaking from the gasket 15, has been allowed to drain from inside the bladder 18 while the polymer 34 is curing without touching the polymer. In the final step, a plug 37 can be attached over the end of the pipe 20 to seal the leakage of any material from the flanged pipe joint 10. This plug 37 can, of course, be a permanently attached cap, as shown in FIG. 6, or can be a removable cap if desired, or it can be replaced with a plug of materials, such as the epoxy cement 34, into the end 38 of the pipe 20 to seal the pipe.

It should be clear at this time that a method for sealing and repairing a flanged gasket leak has been provided which can be easily affected without interfering with the material in the pipe. The bladder material 18 can be any flexible material desired but a flexible polymer material, such as a polyethylene sheeting, can be utilized while the gaskets 25 and 26 can be a fiber reinforced polymer, such as a fiberglass reinforced plastic, which readily attaches to the hardening epoxy 34. Tube 20 and end member 21 can be a metal tube, such as copper or steel. However, the present process is not to be considered as limited to the materials and forms shown which are to be considered illustrative rather than restrictive.

I claim:

1. A method of repairing a flanged pipe joint comprising the steps of:

selecting a flexible sheet of material;

selecting a tube having an end member shaped to fit over an edge of a flanged pipe joint;

mounting said tube through said selected flexible sheet of material to provide a passageway therethrough;

positioning said end member adjacent the flanged pipe joint;

wrapping said selected flexible sheet of material having said tube mounted thereto around said flaged pipe joint;

attaching said wrapped flexible sheet of material around said flanged pipe joint to capture a fluid leaking therefrom and drain said fluid through said tube;

coating said wrapped sheet of flexible material and pipe surface adjacent said flanged pipe joint with a hardenable coating material;

curing said hardenable coating material; and plugging said tube, whereby said tube mounted to said selected sheet of flexible material is attached to the flanged pipe joint to drain any liquid leaking from the flanged pipe joint inside the wrapped sheet of flexible material while a hardenable coating material cures.

2. A method of repairing in accordance with claim 1 in which said hardening coating material is an epoxy polymer which is cured over said flexible sheet of material and adjacent pipe surface.

3. A method of repairing in accordance with claim 2 in which said including step of mixing said epoxy polymer and hardener together prior to applying said epoxy polymer to said flexible sheet of material and adjacent pipe surface.

4. A method of repairing in accordance with claim 1 in which said flexible sheet of material is a polymer sheet material.

5. A method of repairing in accordance with claim 4 in which said polymer sheet material is polyethylene sheet material.

6. A method of repairing in accordance with claim 5 including the step of cutting an opening in said flexible sheet of material and mounting said tube therethrough.

7. A method of repairing in accordance with claim 6 including the step of mounting a first piece of sealing material on said tube adjacent said end member and positioning said tube through said flexible sheet of material opening.

8. A method of repairing in accordance with claim 7 including the step of mounting a second piece of sealing material on said tube on the opposite side of said sheet of flexible sheet of material from said end member.

9. A method of repairing in accordance with claim 8 including step of attaching said tube and said first and second pieces of sealing material to said selected flexible sheet of material.

10. A method of repairing in accordance with claim 9 in which the step of attaching said wrapped flexible material around said pipe joint includes banding said wrapped flexible sheet of material to said flanged pipe joint.

11. A method of repairing in accordance with claim 10 including the step of banding said wrapped flexible sheet of material to seal said material to around said flanged pipe joint.

12. A method of repairing in accordance with claim 11 including the step of banding said wrapped flexible sheet of material and drain tube and end member to said flanged pipe joint.

* * * * *